UNITED STATES PATENT OFFICE.

MICHAEL ONGERTH, OF ALAMEDA, CALIFORNIA, ASSIGNOR OF ONE-HALF TO EVERARD STEELE, OF SAME PLACE.

INSECTICIDE.

SPECIFICATION forming part of Letters Patent No. 385,423, dated July 3, 1888.

Application filed July 5, 1887. Serial No. 243,451. (No specimens.)

*To all whom it may concern:*

Be it known that I, MICHAEL ONGERTH, a citizen of the United States, residing at Alameda, in the county of Alameda and State of California, have invented a certain new and useful Improvement in Insecticide Compounds to be Used in the Extermination of Insects on Trees, Shrubs, and Plants, of which the following is a specification.

In making various experiments for exterminating tree and vine pests, extending over a period of months, I have discovered that naphthaline is peculiarly adapted for the purpose of destroying these pests. Owing, however, to the adhesive or gummy properties of naphthaline, some vehicle or medium is requisite in order to properly prepare, adapt, and apply this substance when employed in a liquid form or condition; hence my invention consists in the use of naphthaline suitably prepared and adapted for the purpose stated, in a liquid form or condition, in connection with other ingredients, as hereinafter recited and then claimed.

With this end in view I proceed to compound, prepare, adapt, and apply the substance known as "naphthaline" in a liquid or fluid form, as stated, viz: fatty oil that will remain limpid at a low temperature, one pound; lime-water, two pounds; pulverized or comminuted naphthaline, say from one-fourth to one-half pound, in weight, or of sufficient quantity to be absorbed entirely and held in solution by the oil. Mix the pulverized naphthaline with the oil until dissolved. Shake or agitate occasionally. Then add the lime-water and thoroughly mingle by shaking or agitation, when the mixture will be in condition for use.

In using the mixture in a liquid form it is applied to the bark of trees or shrubs with a brush or syringe, and care should be taken that all parts of the bark be thoroughly covered with the mixture. By the use in this manner of the above ingredients the scale-bug and other insects are destroyed and the fruits of trees and vines and vegetable matter are matured in a sound and healthy condition.

As the larvæ of the phylloxera are contained in the ground, it is not assumed, neither do I claim, that this pest of vines can be destroyed by my insecticide; yet it may be used with some beneficial effects when applied around the roots of these vines in a liquid state, as above described.

Having thus described my invention or discovery, what I claim, and desire to secure by Letters Patent of the United States, is—

The herein-described composition for use in exterminating insects, consisting of naphthaline, a fatty oil, and lime-water, mingled in suitable proportions, as specified.

In testimony that I claim the foregoing I have hereunto set my hand and seal.

MICHAEL ONGERTH. [L. S.]

Witnesses:
C. W. M. SMITH,
CHAS. E. KELLY.